C. E. JOHNSON.
SUCKLING DEVICE.
APPLICATION FILED NOV. 23, 1915.

1,207,052.

Patented Dec. 5, 1916.
2 SHEETS—SHEET 1.

Inventor
Charles E. Johnson.

By John B Thomas & Co
Attorneys

C. E. JOHNSON.
SUCKLING DEVICE.
APPLICATION FILED NOV. 23, 1915.
1,207,052.
Patented Dec. 5, 1916.
2 SHEETS—SHEET 2.
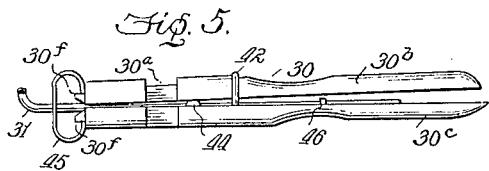
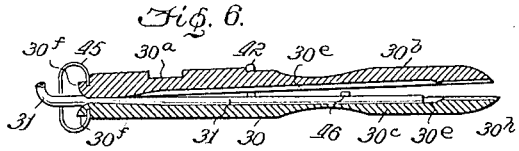
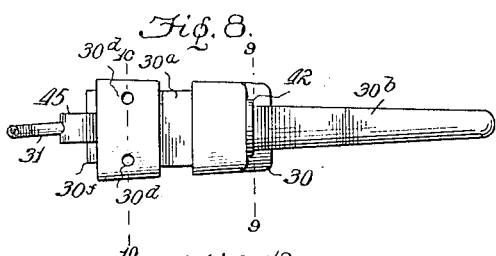
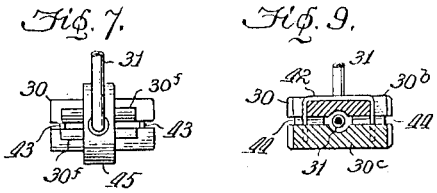
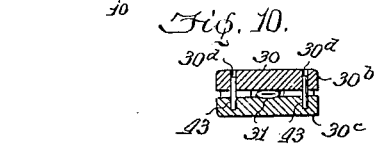
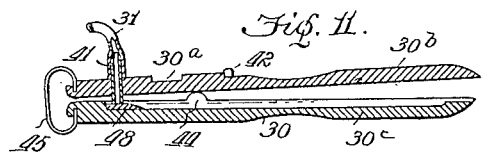
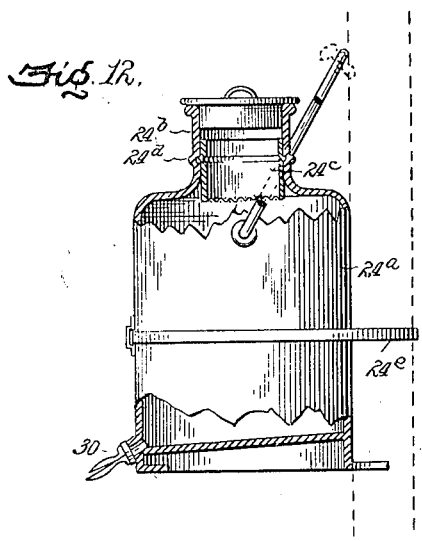
Inventor:-
Charles E. Johnson.
By John B Thomas & Co.
Attorneys.

UNITED STATES PATENT OFFICE.

CHARLES E. JOHNSON, OF FOND DU LAC, WISCONSIN.

SUCKLING DEVICE.

1,207,052.  Specification of Letters Patent.  Patented Dec. 5, 1916.

Application filed November 23, 1915. Serial No. 63,033.

*To all whom it may concern:*

Be it known that I, CHARLES E. JOHNSON, a citizen of the United States, residing at Fond du Lac, in the county of Fond du Lac and State of Wisconsin, have invented a Suckling Device, of which the following is a full and complete specification.

The principal object of my invention is to provide a simple, effective, and sanitary means for feeding and watering animals of all kinds, poultry, &c., whereby the supply of liquid—either food or water—is contained in a closed receptacle for thorough protection from dust, dirt, &c., and is supplied to the animal according to its need.

My invention is primarily adapted for the purpose of feeding calves and other young animals, providing a suckling device which will supply warm milk or other liquid food through the medium of a peculiar form of nipple having a valve which is held normally closed and is opened when the outer end of said nipple is grasped in the mouth of the young animal in the act of suckling.

Other objects and advantages of my invention will hereinafter appear, in the specifications, and what I particularly claim as new and desire to protect by Letters-Patent is more specifically set forth in the appended claims.

Figure 2:
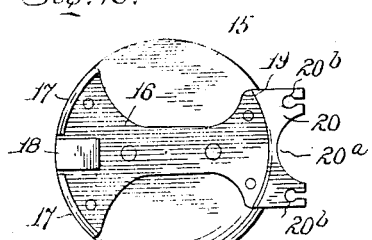
Figure 1:
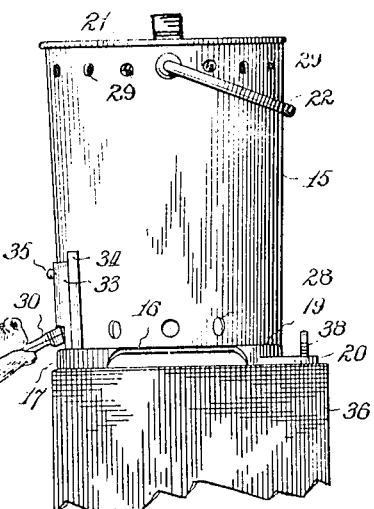
Figure 3:
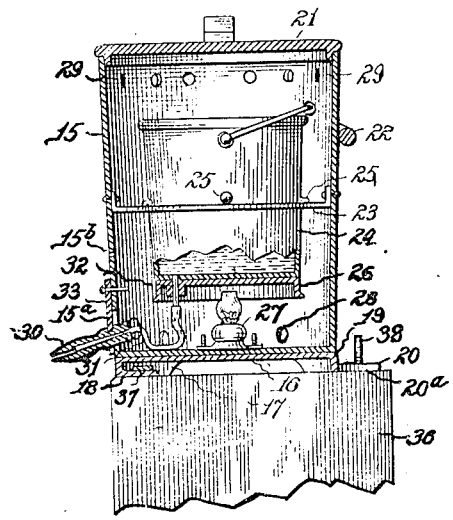
Figure 4:
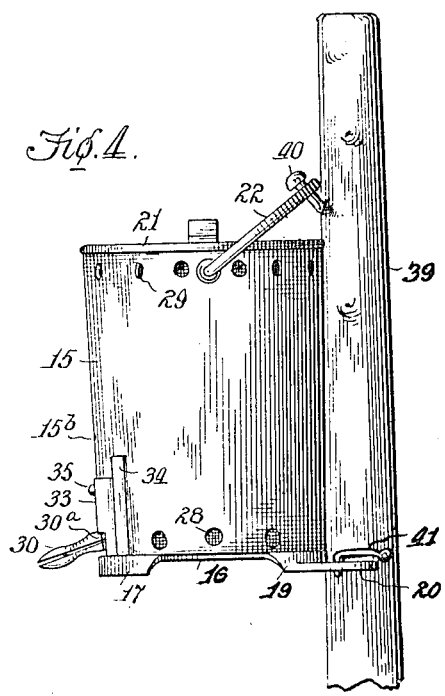

In the accompanying drawings, forming a part hereof Figure 1 is a side elevation illustrating a suckling device constructed in accordance with my invention and mounted on a box to dispose the nipple at a suitable elevation. Fig. 2 is a bottom plan view of the inclosing case of the suckling device. Fig. 3 is a vertical transverse sectional view through the suckling device. Fig. 4 is a side elevation illustrating the manner of supporting the suckling device against a post. Figs. 5, 6, 7 and 8 are detail views of one form of nipple. Figs. 9 and 10 are sectional views through said nipple, on the lines 9—9 and 10—10, respectively, of Fig. 8. Fig. 11 is a view showing a modified form of valve used in connection with the nipple. Fig. 12 shows a modified form of pail and means for attaching the nipple thereto.

In constructing the suckling device I provide in the first instance an inclosing can 15, preferably cylindrical in shape and provided with an attached supporting-base 16, having at its forward end depending supporting flanges 17, 17, with an intermediate inturned locking-tongue 18, and at its rear end a depending flange 19 with a rearwardly projecting portion or plate 20, the latter forming the rear support and provided with a segmental recess $20^a$ and keyhole slots $20^b$, $20^b$, at opposite sides of said recess, for the purpose hereinafter explained. The inclosing case is also provided with a removable cover 21, and pivoted bail 22, and in order to support a pail for the food within said inclosing case or can above the bottom thereof, I attach a ring 23 to the sides of said can, as shown in Fig. 3. An ordinary milk-pail 24 is employed, and is supported from the ring by short lugs 25, the bottom of said pail being provided with a depending annular flange 26. In order to heat the milk or other liquid food in the pail a lamp 27 is secured upon the bottom of the inclosing can, the necessary circulation of air for the lamp being provided by two sets of apertures, 28 and 29, in the lower and upper portions of the can, respectively.

In the present instance the milk is fed from the pail to the young calf, or other animal, by means of a nipple 30, to which the milk is supplied by a rubber tube 31, the latter being connected at one end to said nipple and at the other end to a short metal tube 32 extending through and beyond the bottom of the pail.

The nipple or feeding device which I employ constitutes the most important part of my present invention, and is therefore illustrated in full detail on Sheet 2 of the drawings, and will be hereinafter specifically described. The nipple 30 is firmly held in an opening $15^a$ in the inclosing can by means of a plate or door 33, sliding in guides 34 attached to the can and engaging in recesses $30^a$ in the top and sides of said nipple, said plate or door being held in engagement with the nipple by means of a removable pin 35, and supported in raised position—to permit the nipple to be removed for cleaning, &c.,—by engaging the aforesaid pin in the aperture $15^b$ in the can 15.

When the suckling device is mounted on a box, as 36, (Figs. 2 and 3), the tongue 18 is slid into engagement with a metal loop 37 on the box, and the plate 20 is engaged by turn-buttons 38 which enter the keyhole slots 20$^b$, said buttons being turned to lock the inclosing can firmly and securely to the box. In this manner the suckling device is rigidly held on the box so that it will not be disturbed by the young animal pulling at the nipple. The suckling device may be also firmly and securely supported against a post, as 39, (Fig. 4), and in this instance the bail 22 of the inclosing can 15 is passed over a nail or peg 40, and the supporting-plate 20 at the bottom of said can embraces the post, which fits snugly in the recess 20$^a$, the device being then secured in place by hooks 41 on the post engaging in the round portions of the keyhole slots 20$^b$. It will be noted, therefore, that by the particular construction of the inclosing can I provide for supporting the suckling device either upon a box or from a post, as may be found more convenient.

The nipple, which is illustrated in detail on Sheet 2 of the drawings, is made up of two longitudinal parts, constituting upper and lower half-sections 30$^b$ and 30$^c$, respectively, which are loosely connected together by any suitable means, as for instance a wire loop 42 in conjunction with pins 43, 43, the latter being threaded in the section 30$^c$ to work in apertures 30$^d$ in the section 30$^b$. The sections are separated to have a rocking motion on transverse bosses 44, located near the inner end of the nipple, and so that the inner ends of said sections may clamp upon the rubber tube 31, which extends into the nipple, and cut off the supply of milk or liquid to said nipple. The opposing faces of the sections of the nipple are provided with longitudinal grooves 30$^e$, to receive the rubber tube, and in the present instance these grooves are reduced in depth at the rear end of the nipple so that when the rear ends of the sections are brought together they will clamp on the tube and cut off the supply of liquid which passes into the forward end of the nipple. The rubber tube terminates a slight distance in the rear of the forward end of the nipple so as to discharge into outlet openings, formed by shallow grooves 30$^h$, and in order that the tube may be normally closed I provide a bow-spring 45, the ends of which engage in recessed bosses 30$^f$ at the rear ends of the sections of the nipple. The tube is held in the nipple by any suitable means, as for instance a staple 46, and passes out through an opening 45$^a$ in the bow-spring.

As heretofore stated, the nipple is supported by the inclosing can 15 of the suckling device, so as to project therefrom, and in operation the young animal grips the forward end of said nipple in his mouth and closes the forward ends of the sections 30$^b$ and 30$^c$ upon each other, thus releasing the tube at the rear end of the nipple to permit the milk or liquid to flow freely. Whenever pressure is released on the forward ends of the sections of the nipple the supply is checked automatically by the action of the bow-spring, and therefore the liquid will flow out of the nipple only during the time the animal is suckling or pulling on the nipple.

As will be noted, the rear ends of the sections of the nipple, in connection with the rubber tube, form practically a valve to control the flow of liquid, and instead of having the sections clamp the rubber tube between them I may have one of the sections, as 30$^c$, clamp directly on the end of the tube. In this instance a short metal tube 47 is used (see Fig. 11), and the section 30$^c$ is provided with a yielding pad 48, which impinges against the inner end of said tube; the rubber tube, 31, being connected to the outer end of the metal tube, which latter is secured in the section 30$^b$ in any suitable manner.

As shown in Fig. 12, my invention may be applied in connection with an ordinary form of milk-can 24$^a$, in the neck 24$^b$ of which is fitted a strainer 24$^c$ having a supporting-bead 24$^d$ engaging a corresponding bead in the neck of the can, and the body of said can is provided with a surrounding strap 24$^e$.

Having thus described my invention, I claim:

1. A suckling device comprising a supply for the liquid, a tube leading therefrom, and a feeding-valve composed of two longitudinal parts loosely connected and fulcrumed so as to rock one upon the other, a short tube passing into one of the parts and terminating between the parts of the valve, and a spring for clamping the parts together at one side of the fulcrum, substantially as shown and described.

2. A suckling device comprising a receptacle for the liquid, a tube leading therefrom, and a valve or nipple into which the outer end of the tube projects, the valve consisting of two longitudinal sections spaced apart and fulcrumed intermediate their ends to rock one upon the other and having longitudinal grooves at their inner sides extending to the outer end of the nipple, and means for normally pressing the inner ends of the sections of the valve or nipple together on the tube to close the same.

3. A suckling device for feeding and watering stock, the combination with a receptacle for the liquid and a flexible tube leading therefrom, of a valve or nipple consisting of two longitudinal sections spaced apart and fulcrumed intermediate their ends to rock one upon the other, grooves extending longitudinally along the inner side of said sections and in which the outer end portion of the tube lies, bosses at the inner ends of the sections to pinch the tube and cut off the flow of liquid to the nipple when said inner ends are brought together, and a spring for normally closing the inner ends of the valve or nipple.

CHARLES E. JOHNSON.

Witnesses:
H. I. COLLINS.
GLADYS KLOCK.